(12) United States Patent
Wawrla

(10) Patent No.: US 11,851,316 B2
(45) Date of Patent: Dec. 26, 2023

(54) TANK SYSTEM FOR COOLING A LIQUID USING THERMAL STRATIFICATION

(71) Applicant: AQUIS SYSTEMS AG, Rebstein (CH)

(72) Inventor: Andreas Wawrla, Rebstein (CH)

(73) Assignee: AQUIS SYSTEMS AG, Rebstein (CH)

( * ) Notice: Subject to any disclaimer, the term of this patent is extended or adjusted under 35 U.S.C. 154(b) by 0 days.

(21) Appl. No.: 18/055,906

(22) Filed: Nov. 16, 2022

(65) Prior Publication Data
US 2023/0108102 A1    Apr. 6, 2023

Related U.S. Application Data

(63) Continuation of application No. PCT/EP2021/064406, filed on May 28, 2021.

(30) Foreign Application Priority Data

May 29, 2020    (EP) .................................. 20177511

(51) Int. Cl.
| B67D 1/08 | (2006.01) |
| A23L 2/54 | (2006.01) |
| B67D 1/00 | (2006.01) |

(52) U.S. Cl.
CPC ............. B67D 1/0857 (2013.01); A23L 2/54 (2013.01); B67D 1/0067 (2013.01)

(58) Field of Classification Search
CPC .. B67D 1/0857; B67D 1/0067; B67D 1/0862; A23L 2/54; F25D 31/002

(Continued)

(56) References Cited

U.S. PATENT DOCUMENTS

| 2,328,110 A * | 8/1943 | Thompson ........... B67D 1/0054 |
| | | 62/390 |
| 2,434,374 A * | 1/1948 | Tull ..................... B67D 1/0857 |
| | | 62/177 |

(Continued)

FOREIGN PATENT DOCUMENTS

| CN | 205856155 U | 1/2017 |
| CN | 206843049 U | 1/2018 |

(Continued)

OTHER PUBLICATIONS

International Preliminary Report on Patentability (Chapter II) (Application No. PCT/EP2021/064406) (with Ch. II Claims) dated Dec. 12, 2022 (with English translation).

(Continued)

*Primary Examiner* — Lien M Ngo
(74) *Attorney, Agent, or Firm* — BURR PATENT LAW, PLLC

(57) ABSTRACT

The invention relates to a tank system for cooling, storing and removing a liquid, comprising a tank for cooling the liquid and storing the liquid in a volume along a stratification axis of the volume for thermal stratification along the stratification axis, wherein the tank can be filled through a filling device having a filling inlet in an inlet region along the stratification axis and can be emptied via an outlet in an outlet region opposite the inlet region along the stratification axis. For the purpose of flexible handling, in order to prevent mixing, the supplied liquid is conveyed into a flow, which extends completely or partly in a plane perpendicular to the stratification axis, and is supplied to the liquid stored in the tank, such that the flow runs tangentially to a circular arc that extends in a plane perpendicular to the stratification axis.

16 Claims, 2 Drawing Sheets

(58) Field of Classification Search
USPC .......... 222/146.6, 129, 129.1, 146.1; 62/177, 62/390–394, 395
See application file for complete search history.

(56) References Cited

U.S. PATENT DOCUMENTS

| | | | | |
|---|---|---|---|---|
| 4,742,939 | A * | 5/1988 | Galockin | B67D 1/0074 366/137 |
| 6,293,336 | B1 * | 9/2001 | Emerick, Sr. | C22F 1/08 62/394 |
| 9,987,602 | B2 * | 6/2018 | Kuehl | B67D 1/0861 |

FOREIGN PATENT DOCUMENTS

| | | |
|---|---|---|
| WO | 2018/214129 A1 | 11/2018 |
| WO | 2018/214130 A1 | 11/2018 |

OTHER PUBLICATIONS

International Search Report and Written Opinion (Application No. PCT/EP2021/064406) dated Sep. 7, 2021 (with English translation).
Chinese Office Action (with English translation) dated Jun. 22, 2023 (Application No. 202180038359.6).

* cited by examiner

TANK SYSTEM FOR COOLING A LIQUID USING THERMAL STRATIFICATION

CROSS REFERENCE TO RELATED APPLICATIONS

This application is a continuation of International Application No. PCT/EP2021/064406 filed May 28, 2021, which designated the United States, and claims the benefit under 35 USC § 119(a)-(d) of European Application No. 20177511.1 filed May 29, 2020, the entireties of which are incorporated herein by reference.

FIELD OF THE INVENTION

The present invention relates to a tank system for the cooling, storage and withdrawal of a liquid.

BACKGROUND OF THE INVENTION

The prior art has disclosed, for example, in CN 205856155 U, a tank system for the cooling, storage and withdrawal of liquids, which specifically provides a system for producing cooled soda water or carbonated water.

Most tanks for the cooling, storage and withdrawal of liquids are filled from above, and centrally. Here, the inflowing liquid is normally introduced directly into the tank.

SUMMARY OF THE INVENTION

It is an object of the present invention to be able to provide an improved tank system for the cooling, storage and withdrawal of a liquid, from which cooled liquid can be withdrawn in as great a quantity as possible, or for as long as possible, because the replenishing flow of uncooled liquid mixes as little as possible with the liquid that has already been cooled, and thus warms the latter as little as possible. It is furthermore intended that the present invention also makes this effect according to the present invention possible in a tank-in-tank system.

The tank system according to the present invention serves firstly for cooling a liquid, which may, in particular, be water, in particular, drinking water or mineral or table water. This liquid can be temporarily stored and cooled in a tank of the tank system and subsequently withdrawn. In the tank itself as a vessel for the storage of the liquid, there is a volume that extends along a stratification axis of the tank. In general, the stratification axis runs approximately perpendicular to the liquid surface and thus generally parallel to the direction of gravitational force. In general, it is thus possible, during the storage of the liquid, for a thermal stratification of the liquid in the tank to be established along the stratification axis; that is to say, the liquid adopts a distribution in the tank which is such that cold liquid settles in the lower region of the tank, whereas relatively warm liquid tends to rise upward.

The tank may, for example, have a volume of elongate shape that is in a standing (longitudinal axis oriented vertically) or lying (longitudinal axis oriented horizontally) orientation.

In a dynamic situation in which a withdrawal takes place at the same time as filling, the stratification axis may also be oriented so as to differ from the direction of gravitational force.

The present tank can be filled by means of a filling device which, in turn, has a filling inlet from which the liquid can flow into the tank.

The tank may, for example, be fillable with the stratification axis in an orientation parallel to the direction of gravitational force. The filling inlet then, for example, points downward in the direction of gravitational force. In this case, a diverting device may be positioned downstream of the filling inlet.

The tank may, however, also be filled laterally. Then, the filling inlet is oriented in a plane perpendicular to the stratification axis, that is to say, for example, such that the liquid can flow in substantially horizontally, or parallel to the liquid surface.

In general, the filling inlet is situated in the region of the liquid surface or above the liquid surface, in particular, in the fully filled state or in the state in which the tank has a maximum intended fill level.

If the liquid in the tank is being cooled, then a thermal stratification takes effect at least after a certain period of time because cold water tends to flow in the direction of the base and warm water tends to flow upward. The tank is then replenished with new uncooled liquid via the filling inlet when cooled liquid is withdrawn from the tank. An objective of the tank system is that the withdrawn liquid is at a constant low temperature for as long as possible. The present invention utilizes the fact that, for this purpose, it is fundamentally advantageous for the cooled liquid to be withdrawn at that end of the stratification axis which is situated opposite the inlet, for example, at the base of the tank, because the likelihood of encountering cold liquid is greatest in this region.

Since the withdrawal may generally take place at any time, it should in principle be possible for cooled liquid to be withdrawn at any time.

The tank system according to the present invention is now distinguished by the fact that the effect of a thermal stratification in the storage volume is consistently effected during replenishment of the tank, is maintained for as long as possible, and is utilized in targeted fashion. To achieve this, it is provided according to the present invention that, during the replenishment of the tank with uncooled liquid, as little swirling or mixing of the newly inflowing uncooled liquid with the more or less cooled liquid that is already situated in the tank occurs. In this way, the state of a thermal stratification in the tank can be optimally maintained during replenishment with uncooled liquid. In this way, it can advantageously be made possible for the greatest possible quantity of cooled water or cooled liquid to be withdrawn at as constant as possible a low cooling temperature.

Accordingly, the present invention implements the measure of using technical means to prevent mixing of the liquid within the tank, which can have the effect of destroying a thermal stratification, during the replenishment of the tank. It is fundamentally advantageous to introduce liquid from above, as viewed in the direction of gravitational force, into the upper region of the liquid strata. However, if the liquid is introduced into the tank in uncontrolled fashion, swirling can occur, which can result in mixing of the liquid stratification.

For this purpose, it is either the case that a diverting device is provided in the tank below the filling inlet in order to prevent mixing of the liquid by diverting the liquid that is fed via the filling inlet into a flow with a component that runs in a plane perpendicular to the stratification axis, for example, with a horizontal component.

It is optionally also possible, instead, for the liquid to already be introduced directly via the filling inlet with at least one horizontal component parallel to the liquid surface.

The outlet is in turn arranged on the side opposite the inlet along the stratification axis, such that the thermal stratification can be utilized and newly admitted liquid is not simply conveyed directly through the outlet. In general, specifically in the case of a vertically oriented stratification axis, the inlet may thus be arranged in the upper tank region, whereas the outlet is arranged in the lower region. In principle, for example, during dynamic filling and simultaneous withdrawal, the stratification axis may however also deviate from a vertical orientation, such that the inlet and outlet may also be arranged horizontally offset with respect to one another.

It is particularly preferably possible by means of these measures for an entirely horizontal flow, or a flow in a plane perpendicular to the stratification axis, to be generated, such that the flow runs tangentially with respect to a circular arc in this plane about the stratification axis. The inflow of the fed liquid thus initially does not cause any flows in a vertical direction or in the direction of gravitational force, which would result in the thermal stratification along the stratification axis being disrupted.

Since the inflowing liquid quantities initially move horizontally, it is duly possible for flows or swirling to occur which run(s) initially primarily, but inter alia, in a horizontal plane. In a viewing direction parallel to the stratification axis, the liquid moves in a circle. It is first as a consequence of this flow that influencing of the thermal stratification in a vertical direction may partially also occur. This effect is however generally significantly less pronounced than in the case of a vertical inflow of the liquid into the tank.

In order to even more strongly suppress swirling, the introduced liquid may be divided into two or more partial flows. If these flow in opposite directions, these can for example form flows which rotate in opposite directions along the surface and which partially cancel one another out. Swirling that would promote mixing can thus be suppressed.

The effect according to the present invention, which maintains the existing thermal stratification and prevents swirling or mixing, not only has an effect on the steady-state thermal stratification that arises as a result of natural convection but is also applied to the dynamic situation that is of importance, in particular, during the dispensing of the liquid and thus during the replenishment of the tank. During this operation, the present invention prevents the mixing of inflowing uncooled liquid and the cooled liquid that is already situated in the tank. For the ability to hold cooled water available for as long as possible, it is advantageous for this stratification to be maintained for as long as possible.

If cooled water is withdrawn, water can be fed in again in the upper region in order to fill the tank. The quantity of water that is fed in may be based on the quantity of cooled water that has been withdrawn. The water is fundamentally cooled in the tank. If the water stored in the tank has already been present therein for a certain period of time, it can generally be assumed that the water has, overall, a more uniform temperature then when replenishment with water had just taken place. A thermal stratification may however in principle be present at all times. The temperature differences within the thermal stratification may however vary depending on whether a replenishment with water has just occurred, which water is still to be cooled, or whether the water has already been present in the tank for a relatively long period of time and has already been cooled.

Owing to the thermal stratification, it is, however, at least possible for a certain quantity of cooled water to be withdrawn at all times.

In principle, the stratification may advantageously even be maintained until ideally all of the cooled water has been withdrawn, such that the dispensed water can also be at an approximately constant low temperature.

However, if the tank has been completely emptied, the cooling appliance may have to cool the relatively warm replenished liquid.

If only a proportion of the cooled liquid in the tank is withdrawn, a thermal stratification by means of the present invention is also advantageous because it then tends to be maintained as a result of natural convection. This in turn means that, if it is intended to withdraw cooled liquid again, it also remains possible for cooled liquid to be withdrawn, and the water quantities that have already been most intensively cooled are not directly mixed with replenished liquid, because the liquid to be withdrawn would thus have been warmed as a result of the mixing.

If the tank is replenished with liquid, this liquid is in turn gradually cooled in the tank by means of a corresponding cooling system.

The diverting device is distinguished, in particular, by the fact that it is, in principle, a purely mechanical means and can be implemented without great outlay and can also be retrofitted in existing tank systems. Furthermore, the course of the flow can be determined such that mixing and destruction of the thermal stratification can be minimized, even in a manner adapted to basically all possible tank shapes. It is, however, furthermore also possible by means of the diverting device for a proportion of the kinetic energy of the liquid which is to be introduced, which liquid impinges on and must flow through the diverting device, to be consumed such that swirling and mixing can be even more strongly suppressed.

It is advantageously the case, in one exemplary embodiment of the present invention, that the diverting device is arranged radially offset with respect to the stratification axis. Since the diverting device forms a flow with a pronounced horizontal component, it is advantageous that this flow can run offset with respect to the center or with respect to the stratification axis, for example, along the wall of the tank, about the stratification axis over as great a distance as possible in order to avoid turbulence or swirling. In this way, it is possible to prevent the liquid from impinging approximately frontally on the wall, which could promote swirling. This is, in particular, facilitated, according to the design variant, in that the diverting device is correspondingly offset radially with respect to the stratification axis, that is to say is not arranged directly in the center, and the liquid can thus move over as great a distance as possible without impinging frontally against a wall and being caused to swirl.

In order to lengthen the path of the fed liquid and thus prevent splashing of the liquid or other turbulence, the diverting device may form a circular arc around the stratification axis, which the fed water must correspondingly follow. In particular, it is thus possible for the distance over which the flowing liquid releases its kinetic energy to be maximized.

In particular, in one design variant of the present invention, the filling inlet may likewise open into the diverting device in a manner radially offset with respect to the stratification axis. Even if the liquid is introduced into the tank via the center in the region of the stratification axis, the liquid can be directed in a radial direction to the edge of the tank before passing into the diverting device or to the liquid stored in the tank. In principle, it is furthermore also possible for the filling device and diverting device to be configured as one component. Furthermore, the diverting device may also be open in the upper region, whilst the filling inlet is situated immediately above the opening, such that the liquid can flow from above into the diverting device.

To establish a flow that runs entirely or substantially in a plane perpendicular to the stratification axis, the diverting device may have a lateral inlet, or in principle also multiple lateral inlets, from which the liquid flows out of the diverting device. The diverting device is advantageously configured such that the liquid, after flowing out of the filling inlet, flows in a defined manner in a specified channel of the diverting device for a period of time such that no turbulence arises, but rather a laminar or at least approximately laminar flow can particularly preferably form. In particular, if the diverting device runs approximately in the shape of a circular arc, the inlets out of the diverting device may be configured as tangential inlets. In principle, one inlet on the diverting device is sufficient. In the case of a circular arc shape of the diverting device, it is also possible for tangential inlets to be provided to each of the two sides of the circular element. The selection of how many tangential inlets are provided may, in particular, also be dependent on the geometry and the size of the tank. Two oppositely arranged tangential inlets may, for example, be avoided if tank is relatively small in terms of its diameter and the flows caused by the tangential inlets then impinge on one another, such that turbulence is generated as a result. It is also conceivable for specifically two inlets to have the effect that the flow is weakened overall, and thus mixing of the thermal stratification can be even more efficiently prevented.

The filling inlet is positioned such that it can release liquid to the diverting device. The filling inlet may, for example, be arranged such that the liquid from the filling device flows through the diverting device in opposite directions in different sections of the diverting device. It is in principle also conceivable for the filling inlet to be provided at one end of the diverting device and for the liquid to thus be able, overall, to flow over as great a distance as possible in one direction through the diverting device, which may contribute to the ability to generate as laminar a flow as possible.

In order to generate as horizontal a flow as possible, the diverting device itself may be arranged and oriented substantially horizontally or in a plane perpendicular to the stratification axis. This applies, in particular, to the line path that the diverting device itself forms. A relatively simple construction of the diverting device consists in the latter having a base plate which runs correspondingly horizontally or in a plane perpendicular to the stratification axis. The base plate prevents the water or the liquid from flowing in a vertical direction, at least over a certain region, and directs the water along the path specified by the diverting device.

In one refinement of the present invention, the diverting device comprises at least two directing elements, which, in particular, follow a circular arc shape, for directing the liquid within the device. The directing elements may be arranged perpendicularly on the base plate. The liquid thus flows in a specified direction. It is particularly advantageous here for the channel for the water through the specified directing elements to be selected not to be too wide, such that an approximately laminar flow can form relatively quickly, and swirling is prevented as far as possible. In this way, the existing thermal stratification can be maintained for as long as possible.

Barrier elements may be provided on the base plate in the region of the tangential inlets. In this way, the flow cross section is initially reduced once again, in particular, where flow passes out into the tank. By means of this measure, it is, however, possible for more strongly vertically running flow components to be weakened or intercepted, such that, in particular, a funnel-shaped outflow of the liquid from the diverting device, which intrinsically already has vertical flow components, can be prevented. Swirling can thus be reduced by means of this measure.

Furthermore, in one embodiment of the present invention, it is also possible for yet further directing elements to be provided. For example, the region of the tangential inlet, there may also be provided horizontally arranged directing elements for limiting the flow as far as possible to a horizontally running flow component. Such a platform may, for example, be arranged above or below the tangential inlet in the direction of gravitational force. Such a platform can thus likewise contribute to laminarization and prevent turbulent flows. An arrangement of such a platform above the tangential inlet in a horizontal orientation may in particular also be additionally used if the diverting device is otherwise configured to be upwardly open in the direction of gravitational force, and the liquid is introduced from there into the diverting device.

A tank system according to an exemplary embodiment of the present invention may in principle comprise one or more tanks. For example, a nested construction may advantageously be provided, in which the tank, in turn, has an additional inner tank that is accommodated entirely in the volume of the tank. It is also conceivable for another hollow volume to be arranged in the interior of the tank. Other components, such as a pump, may, for example, also be accommodated in the hollow volume.

An inner tank that is provided may, for example, also be utilized for treating the liquid, for example, for carbonating the water. Cooling and carbonation are advantageously separated from one another. For example, during the introduction of gas for the generation of sparkling water, the entire volume would be mixed in any case. Furthermore, it is advantageously possible for the tank for cooling and the inner tank for carbonation to be connected in series, such that water that has already been cooled can pass into the inner tank in order to finally be carbonated there. Cooled, freshly carbonated water can thus subsequently be withdrawn from the inner tank. The inner tank may be filled with the water from the tank by means of a pressure pump. In turn, a refrigerant may flow through the cooling system, in particular, the coil or the double wall.

Preferably, the tank and inner tank have a rotationally symmetrical shape, in particular, about the stratification axis. If the tank is a hollow cylindrical vessel, the flow in the hollow cylinder can be directed around the stratification axis, for example, in a channel, and flow primarily in a horizontal direction, whilst vertical mixing is substantially prevented.

In this regard, there are effects that can be utilized in targeted fashion, in two respects.

If the diverting device is configured to have two openings in opposite tangential directions, the liquid flowing in through the filling inlet is divided into two partial flows that flow tangentially in circular fashion in different directions. In the flow through the channel and upon the subsequent impingement of the two partial flows against one another, the inflowing liquid dissipates kinetic energy, whereby swirling and mixing with the cooled liquid that is already situated in the tank is prevented or significantly reduced. In this way, according to the present invention, a thermal stratification in the tank can be promoted and maintained for longer.

If the diverting device is configured to have a tangential opening only in one direction, the liquid that flows in through the filling inlet flows substantially tangentially only in one direction or in circular fashion, and can thus cause a rotational movement of the liquid in the tank.

Furthermore, however, such a design can be implemented in a particularly compact and thus space-saving manner. Specifically in the case of a modular construction, such an assembly can be handled as an independent structural unit.

For example, a cooling coil or a double wall of one of the tanks may be provided for the purposes of cooling the entire volume. The coil promotes the cooling within the entire tank volume by extending in spiral fashion through the entire tank. Flow can pass around the coil, such that the liquid in the tank volume can be cooled effectively and quickly. The coil can, in particular, be arranged in space-saving fashion around the inner tank. A certain cooling effect can at the same time also be achieved for the inner tank, that is to say the inner tank is jointly cooled in parallel with the volume of the tank.

Since the tank system is particularly advantageously suitable for the preparation of beverages, the tank system may, in particular, be manufactured at least partially from plastic that is suitable for use for drinking water. It is conceivable for the tank and/or inner tank to be manufactured from high-grade steel, whereas, for example, withdrawal pipes, filling device and/or diverting device are composed of a plastic that is suitable for use for drinking water.

In a particularly preferred refinement of the present invention, the opening of the at least one withdrawal pipe for the withdrawal of the liquid from the tank or from the inner tank is arranged in the lower region of the respective tank, such that liquid which is as cool as possible can be withdrawn, and the thermal stratification is advantageously utilized.

Furthermore, it is additionally also possible for the inner tank to be equipped with a diverting device according to the present invention, such that a thermal stratification is also maintained in the inner tank for a relatively long period of time. This may also be dependent on the nature of the preparation that is performed in the inner tank.

BRIEF DESCRIPTION OF THE DRAWINGS

An exemplary embodiment of the present invention is illustrated in the drawings and will be discussed in more detail below, with further details and advantages being specified.

DETAILED DESCRIPTION OF THE INVENTION

Figure 1:
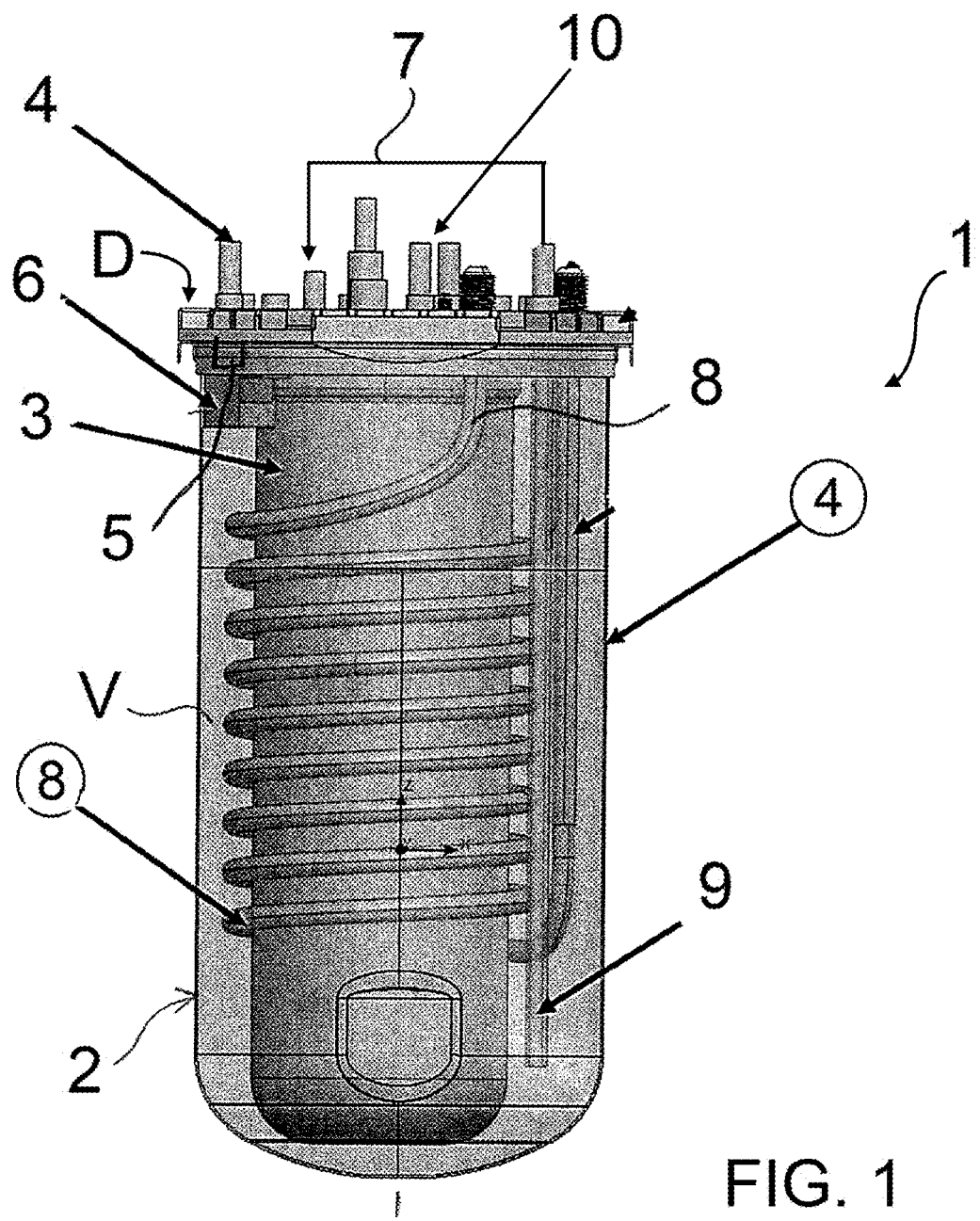
FIG. 1 is a schematic illustration of the tank system according to the present invention.

FIG. 1 shows a tank system 1 having a tank 2, in the volume of which an inner tank 3 is arranged. The tank 2 serves firstly for the cooling of water which, by means of the filling device 4, is introduced at the cover side via the cover D in the upper region of the tank 2. The filling device 4 comprises a pipe which is offset radially toward the wall of the tank 2 in relation to the stratification axis L. This pipe of the filling device 4 comprises a filling inlet 5 that opens into a diverting device 6. The diverting device 6 extends in the shape of a circular arc along the wall of the tank 2 and will be described in detail in conjunction with FIG. 2.

The volume V of the tank 2 forms a hollow cylinder that surrounds the inner tank 3. A cooling coil 8 is arranged around the inner tank 3. Furthermore, an withdrawal pipe 9 is provided, which is configured as a lance and which projects from the cover D through the volume V as far as into the lower region of the tank 2. The tank 2 and the tank system 1 can thus benefit from a thermal stratification if the liquid that is to be cooled is cooled continuously by means of the coil 8 and water that is cooled in the process primarily settles in the lower region, such that correspondingly cooled water can also be withdrawn via the lance 9.

The cooled water is finally conducted via the withdrawal pipe 9 and the line 7 into the inner tank 3. The inner tank has connectors 10 by means of which carbon dioxide can be directed into the tank in order to carbonate the water. The withdrawal pipe 9 and also the filling device 4 may be formed from a plastic which is suitable for use for drinking water, and which is furthermore thermally conductive in order to assist the cooling.

Figure 2:
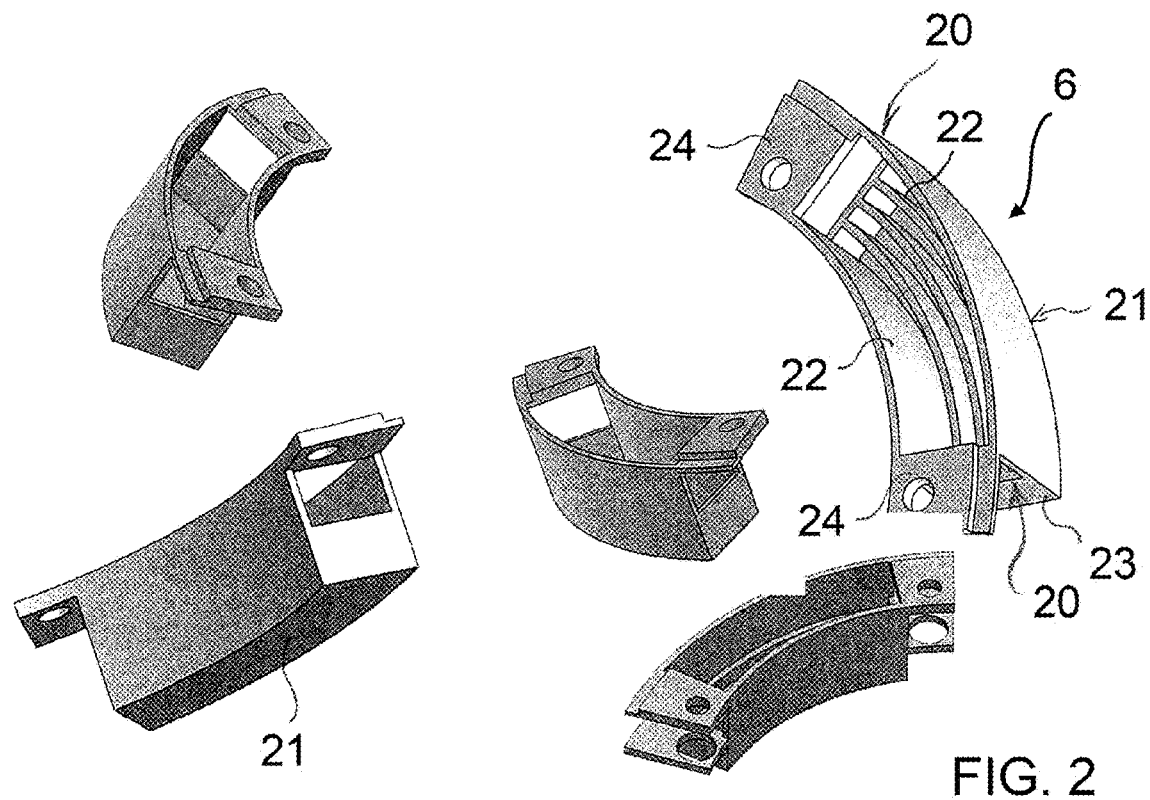
FIG. 2 is a schematic illustration of the diverting device for a tank system according to the present invention.

FIG. 2 illustrates the diverting device 6, which is configured as a circular-arc-shaped element. In the present case, the diverting device has two tangential inlets 20, which are arranged at the ends of the circular arc portion. In the upper region in the direction of gravitational force, the diverting device 6 is configured to be open. In the lower region, the diverting device terminates with a base plate 21. Standing perpendicular to the base plate 21 are directing elements 22, which follow the circular arc shape and which can direct the water in the manner of a channel Arranged under the tangential inlets 20 are barriers 23, which once again reduce the inlet cross section such that the water can emerge as horizontally as possible via the tangential inlets 20. To assist the laminarization, horizontally running directing platforms 24 are arranged above the tangential inlets 20.

Figure 3:
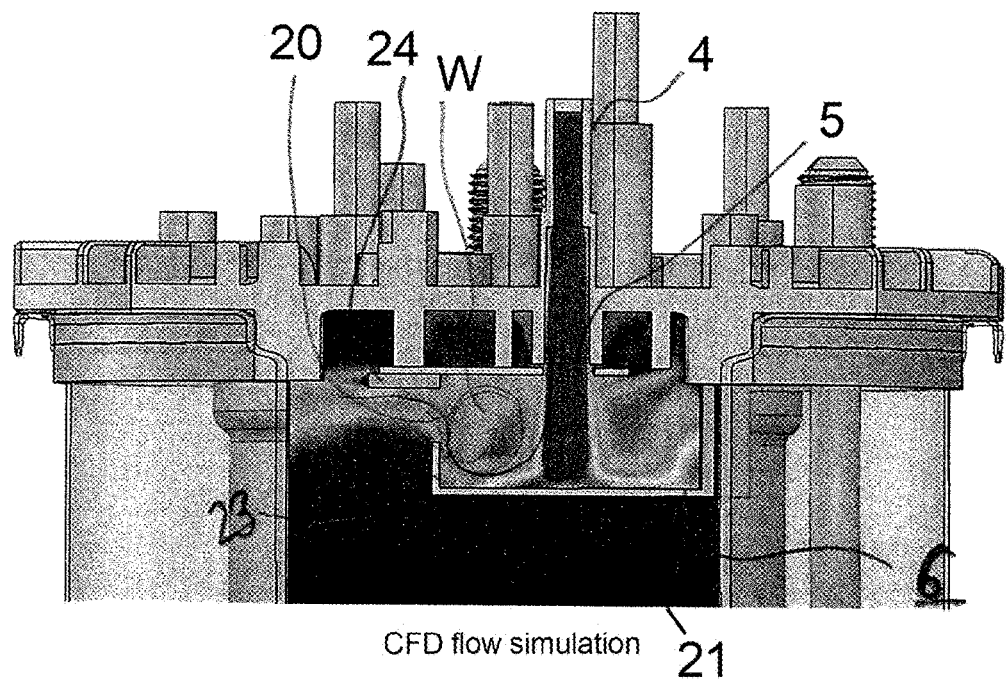
FIG. 3 is a schematic illustration of a flow situation with a diverting device which, in this case, is arranged in the inner tank.

FIG. 3 illustrates a filling device 4, but for an inner tank 7, wherein the filling device 4 opens into a filling inlet 5, which in turn is arranged directly above the diverting device 6. In the case of this device, a swirl W forms exclusively in the interior of the diverting device 6, and the water flows out substantially horizontally via the tangential inlets 20. Here, too, a base plate 21 and a barrier 23 are provided in the region of the tangential inlet 20, which base plate and barrier are in turn supplemented by a horizontal directing platform 24. Owing to the substantially horizontal flow of the introduced water, mixing of the thermal stratification can thus be avoided, and it is made easier to achieve that cold water is always available for withdrawal in the lower region of the tank.

REFERENCE DESIGNATIONS

1 Tank system
2 Tank
3 Inner tank
4 Filling device
5 Filling inlet
6 Diverting device
7 Line
8 Cooling coil
9 Withdrawal pipe/lance
10 Carbonation/$CO_2$ feed
20 Tangential inlet
21 Base plate
22 Directing element
23 Barrier element 24 Horizontal platform
D Cover
L Stratification axis
V Tank volume
W Swirl

The invention claimed is:

1. A tank system for the cooling, storage and withdrawal of a liquid, comprising a tank for the cooling of the liquid and storage of the liquid in a volume along a stratification axis of the volume, such that a thermal stratification of the liquid in the tank can be established at least partially along the stratification axis, wherein the tank can be filled along the stratification axis through a filling device having a filling inlet in an inlet region and can be emptied via an outlet in an outlet region that is situated opposite the inlet region along the stratification axis, wherein, in the tank, to prevent mixing of the liquid in the volume along the stratification axis, the filling device is configured to direct the liquid into at least one flow that runs entirely or partially in a plane perpendicular to the stratification axis and to feed said liquid to the liquid stored in the tank such that the flow flows tangentially with respect to a circular arc that runs in a plane perpendicular to the stratification axis, wherein:

the filling device, below the filling inlet, comprises a diverting device for diverting the liquid that emerges from the filling inlet into a flow that runs at least partially perpendicular to the stratification axis with a horizontal component, and/or an entirely horizontal flow, wherein the tank can be filled via the filling inlet from above with a component parallel, or entirely parallel, to the orientation of the stratification axis, where, to establish a flow that runs entirely or substantially in a plane perpendicular to the stratification axis, the diverting device has at least one lateral inlet, from which the liquid flows out of the diverting device, whereby the diverting device has one tangential inlet or two tangential inlets.

2. The tank system as claimed in claim 1, wherein the filling device and/or the diverting device is configured to divide the liquid into at least two flows which flow in mutually opposite directions, and which are fed to the liquid stored in the tank such that swirling can preferably be avoided.

3. The tank system as claimed in claim 1, wherein the diverting device is arranged radially offset with respect to the stratification axis.

4. The tank system as claimed in claim 1, wherein the diverting device forms a circular arc around the stratification axis.

5. The tank system as claimed in claim 1, wherein the filling inlet opens into the diverting device in a manner radially offset with respect to the stratification axis.

6. The tank system as claimed in claim 1, wherein the diverting device is arranged relative to the filling inlet such that liquid from the filling device flows through said diverting device in opposite flow directions in different sections of the diverting device.

7. The tank system as claimed in claim 1, wherein the diverting device:
is arranged horizontally and/or in a plane perpendicular to the stratification axis, and/or
has a base plate arranged horizontally and/or in a plane perpendicular to the stratification axis.

8. The tank system as claimed in claim 4, wherein the diverting device has at least two directing elements that follow the circular arc shape, for directing the liquid within the diverting device, wherein the directing elements are arranged perpendicular to the base plate.

9. The tank system as claimed in claim 1, wherein the diverting device comprises:
at least one of the tangential inlets, in each case one base-plate-side barrier element for mixing the liquid in the interior of the diverting device, and/or
at least one horizontal platform for laminarizing and vertically fanning out the liquid at least one of the tangential inlets.

10. The tank system as claimed in claim 1, wherein the tank forms a hollow volume.

11. The tank system as claimed in claim 1, wherein the tank:
comprises an inner tank for the carbonation of the liquid that is cooled in the tank, which inner tank is accommodated entirely in the volume of the tank,
wherein the tank and/or the inner tank have a rotationally symmetrical shape about the stratification axis.

12. The tank system as claimed in claim 11, further comprising a cooling system, configured as a coil or as a double wall, provided around the inner tank.

13. The tank system as claimed in claim 1, wherein the tank system is manufactured at least partially from plastic that is suitable for use with drinking water.

14. The tank system as claimed in claim 11, wherein an opening of the withdrawal pipe for the withdrawal of the liquid from the tank and/or from the inner tank is arranged in the lower region of the respective tank.

15. The tank system as claimed in claim 11, wherein, for the filling of the inner tank, a device is provided for admixing a carbon-dioxide-containing gas into the liquid.

16. The tank system as claimed in claim 11, wherein the tank and the inner tank are connected to one another via one of withdrawal pipes such that liquid can be directed from the tank into the inner tank.

* * * * *